United States Patent [19]

Dixon

[11] 4,176,829
[45] Dec. 4, 1979

[54] BURNER TIP DRAG GUIDE
[76] Inventor: Jack B. Dixon, 7102 Fircrest Ave., Sebastopol, Calif. 95472
[21] Appl. No.: 869,100
[22] Filed: Jan. 13, 1978
[51] Int. Cl.² .............................................. B23K 7/10
[52] U.S. Cl. ..................................................... 266/66
[58] Field of Search .................................. 266/66, 48
[56] References Cited
U.S. PATENT DOCUMENTS
2,486,575  11/1949  Rooke ................................... 266/66
FOREIGN PATENT DOCUMENTS
454018  9/1936  United Kingdom ...................... 266/66

Primary Examiner—Paul A. Bell
Attorney, Agent, or Firm—LeBlanc & Shur

[57] ABSTRACT

A drag guide member for a torch nozzle is disclosed which will guide a burner tip during a metal cutting operation. The drag guide member of this invention is readily replaceable when worn through contact with the kerf. In one embodiment, a gun sight member having shoulders thereon adapted to ride on the edges of the kerf is threadedly received in the lower portion of the burner tip. In an alternative embodiment, a ring member adapted to be threadedly mounted on the circumference of the burner tip is provided. Said ring member mounts spaced gun sights about the circumference thereof so that when one gun sight is worn, the ring may be rotated to position a replacement member.

5 Claims, 7 Drawing Figures

U.S. Patent  Dec. 4, 1979  4,176,829
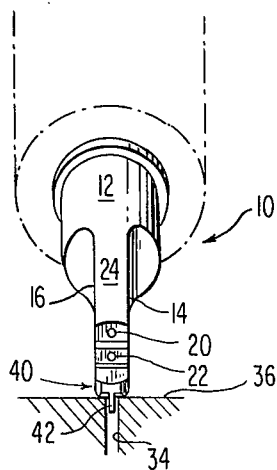
FIG.2
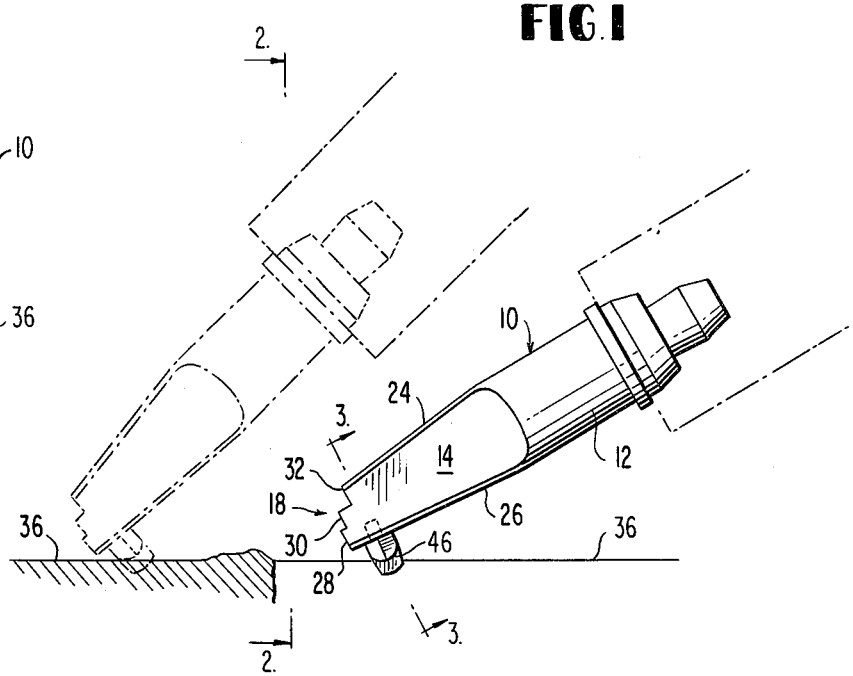
FIG.1
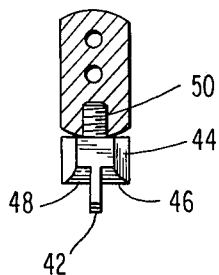
FIG.3
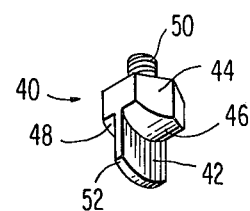
FIG.4
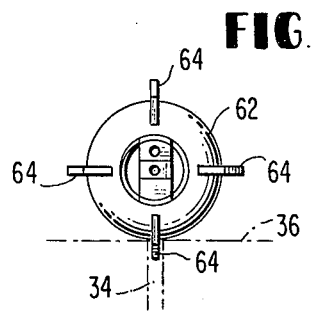
FIG.6
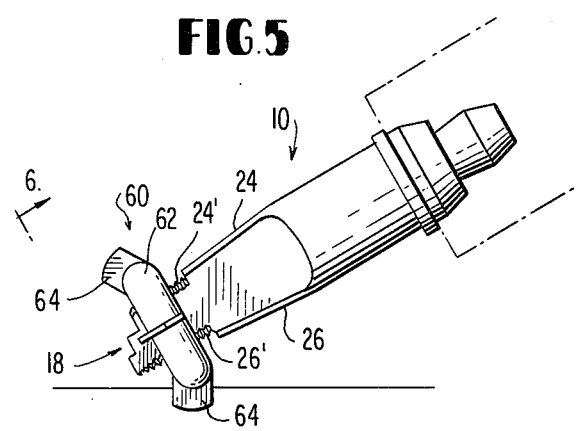
FIG.5
FIG.7

BURNER TIP DRAG GUIDE

This invention relates to an improved means to facilitate metal cutting and specifically to an inexpensive drag guide member for the burner tip which is replaceable, and which will not interfere with normal cutting operations.

It is well known that metal cutting operations with a torch are facilitated if the burner tip thereof is guided and steadied so that the tip is maintained a uniform distance from the metal and moved therealong at a constant speed. Many complex mechanical devices have been proposed to guide a burner tip by the use of one or more extension arms which are attached to the nozzle and are adapted to ride on the metal surface on in the kerf. See for example U.S. Pat. Nos. 3,698,701, 2,139,471 and 2,125,916. These devices, however, are bulky and complex to operate. Therefore, these prior devices are not uniformly suited to all cutting operations.

It has been the practice in the prior art to utilize a shaped burner tip instead of a special attachment. The burner tip, as disclosed in, for example, U.S. Pat. No. 1,474,957 has opposed beveled surfaces to provide a gun sight for directing movement of the burner tip along a predetermined path. The device also has an angled face attachment adapted to ride over the edges of the kerf. In another well-known version, the burner tip is beveled to a wedge shape and the tip thereof is intended to ride in the upper portion of the kerf for better alignment and to produce a drag on the torch to facilitate a uniform cutting speed.

However, due to the type of metal used for burner tips, surfaces thereof which contact the kerf or edges of the kerf are susceptible to wear. In actual practice, these surfaces wear quickly requiring frequent replacement of the entire burner tip.

It was suggested in U.S. Pat. No. 2,486,575 to provide a drag rod having a beveled end which rod is coupled to the head of the torch. The drag rod is disposed adjacent the burner tip to ride in the kerf cut by the torch. Although the rod is replaceable, the attachment collar mounts the drag rod in a position which requires a cutting angle of the burner tip normal to the surface of the metal to be cut. In addition, the bulky collar attachment restricts visual observation of the cutting operation.

There is therefore a need for a replaceable drag guide member for a burner tip which will ride in the kerf without restricting visual observation of the cutting operation. There is also a need for a drag guide member which is operable when the cutting angle of the burner tip is less than 90° relative to the surface of the metal to be cut.

It has been discovered that the drag guide member of this invention solves the above problems by providing a gun sight threadedly mounted on the burner tip, itself, which is adapted to ride in the kerf cut by the torch. The drag member may then be readily replaced when worn and may be constructed of wear-resistant metal, if desired. The replaceable drag guide member then eliminates the need for replacement of the much more expensive burner tip.

In one embodiment of this invention, the drag guide member is a single gun sight threadedly received in a hole provided adjacent the end of the burner tip. The gun sight when mounted on the tip is adapted to extend downwardly into the kerf from rounded shoulders thereon which shoulders are adapted to ride on the edges of the kerf. The shoulders also provide pivot points for rotating the burner tip approximately 45° at the end of a cut.

In another embodiment of this invention, preferably four gun sight members extend outwardly from a central supporting ring. The gun sights are equidistantly spaced about the circumference of the ring. The ring is then adapted to be threadedly mounted on the burner tip surrounding the end portion thereof so that when one gun sight is worn away, the ring may be rotated for example 90° to provide a replacement gun sight drag member. When all gun sights are worn away, the ring may be readily removed from the burner tip and replaced.

It is therefore an object of this invention to provide a means for preventing excessive wear of burner tip members through contact with the kerf cut thereby, which will guide the burner tip and assist in maintaining a proper cutting speed during cutting operations.

It is another object to provide a replaceable gun sight member adapted to be mounted on the burner tip adjacent the end thereof which will ride in the kerf cut by the burner.

It is still another object of this invention to provide a replaceable drag guide member for a burner tip which is threadedly mounted thereon which will ride in the kerf cut, and provide rounded shoulder members adapted to ride on the edges of the kerf.

It is yet another object of this invention to provide multiple gun sight members equidistantly spaced about a supporting ring, which ring is adapted to threadedly receive the end of the burner tip whereby the lower of said gun sight members will be a drag guide for said burner tip by riding in the kerf cut thereby.

It is still another object of this invention to provide a gun sight member which is threadedly received in a hole adjacent the end of the burner tip at the lower surface thereof which gun sight member will ride in the kerf cut by the burner tip, and which provides shoulders thereon for riding on the edges of the kerf, which shoulders provide pivot points for rotating the burner tip to change the angle between the burner tip and the surface of the metal to be cut.

These and other objects will become readily apparent with reference to the drawings and following description wherein FIG. 1 is a side view of a burner tip having an embodiment of this invention mounted thereon and illustrating the said tip in phantom with the metal to be cut in cross section.

FIG. 2 is a view taken along lines 2—2 of FIG. 1.

FIG. 3 is a view taken along lines 3—3 of FIG. 1.

FIG. 4 is a perspective view of an embodiment of this invention.

FIG. 5 is a side view of another embodiment of this invention.

FIG. 6 is a view taken along lines 6—6 of FIG. 5.

FIG. 7 is a side view in partial section of the embodiment of this invention shown in FIG. 5.

With attention to the drawings, FIGS. 1-3 illustrate a conventional burner tip 10 adapted to the embodiment of this invention shown in FIG. 4. Burner tip 10 comprises a generally cylindrical body 12 terminating in beveled edges 14 and 16 which form the tip portion 18. With attention to FIG. 2, the tip portion 18 comprises, as is well known, an upper hole 20 and a lower hole 22.

Beveled edges 14 and 16 are connected by an upper surface 24 and a lower surface 26 which normally is slightly rounded. The tip portion 18 defines a leading surface 28, a surface 30 surrounding hole 22, and a second surface 32 surrounding hole 20 which surfaces preferably are cut in steps as shown in FIG. 1. As is well known, hole 20 expels a mixture of gases under relatively low pressure used to heat the metal to be cut, and hole 22 expels oxygen under high pressure. As shown in FIG. 2, the width of the cut 34 in metal 36 is dictated by the diameter of hole 22.

The drag guide member of this invention may take the form shown in FIGS. 1-4 as follows: drag guide member 40 consists of a depending gun sight 42 adapted to extend from a base member 44. Base member 44 forms shoulders 46 and 48 disposed at either side of gun sight member 42. Base member 44 is adapted to be mounted on the lower surface 26 of burner tip 10 at the end portion 18 by a threaded member 50 which is received in a hole in said surface 26.

As shown in FIGS. 1 and 2, gun sight member 42 drops into the channel 34 cut in metal 36. Shoulders 46 and 48 act as pivot points to position the nozzle and burner tip 10 relative to the surface of the metal 36 to be cut. Preferably, gun sight member 42 comprises a rounded beveled leading edge 52 to assist in passage along the channel 34 in metal 36. The contact of gun sight member 42 in channel 34 with the edges thereof will cause wear. When the gun sight member is sufficiently worn, base 44 is rotated to withdraw the threaded member 50 from surface 26, and the worn drag guide member withdrawn and discarded. The worn member may then be replaced with a new drag guide member 40 mounted by rotating base 44 thereof to threadedly engage member 50 in the hole in surface 26.

With attention to the embodiment of members 5-7, upper and lower surfaces 24 and 26 of burner tip 10 may be threaded for receiving a multiple drag guide member 60. Member 60 comprises a circumferential ring 62 mounting gun sight members 64 at 90° angles around the circumference thereof. As will be obvious to those skilled in the art, only two gun sight members 64 may be provided, or a single gun sight member, as desired.

As shown in phantom in FIG. 7, and in cross section in FIG. 5, the periphery of ring 62 is concave to form rounded shoulder members adjacent gun sight members 64 which are equivalent to shoulder members 46 and 48 of the embodiment of FIGS. 1-4. As shown in FIG. 7, the interior 66 of ring 62 is threaded for mounting on the threaded end portion 24' and 26' of surfaces 24 and 26 as shown in FIG. 5. Therefore, when a gun sight member 64, travelling in a channel 34 cut in metal 36 becomes worn, the ring 60 may be rotated about the nozzle 90° whereby an unworn gun sight member 64 will replace the worn member disposed in the position shown in FIG. 5 directly below surface 26 whereby the end portion 18 of burner tip 10 may be disposed at a proper angle while cutting a channel 34 in metal 36.

As will be obvious to those skilled in the art, the drag guide member of this invention may be constructed of metals, as desired. The tip member may be constructed of softer metals such as copper or mild steel, or of harder metals such as tempered steel or alloys. Furthermore, the embodiment of FIGS. 5-7, may comprise one or more gun sight members mutually spaced around the circumference of the ring which in turn surrounds the tip portion of the burner tip. In the alternative, a single gun sight member, as shown in FIGS. 1-4, may be provided which is individually mounted on the lower surface of the tip end of the burner tip. In the case of either embodiment, however, it is preferred that the drag gun sight member be threadedly mounted on the burner tip rather than force fitted or the like so that it may be easily removed when worn. In the case of the embodiment of FIGS. 5-7, one or more set screws may be utilized in lieu of a threaded engagement between surfaces 24' and 26', and the internal surface 66 of the ring member 62.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced herein.

What is claimed and desired to be secured by United States Letters Patent is:

1. In a burner tip used in a metal cutting operation for cutting a channel therein, having an elongated nozzle terminating in an end portion forming gas jets, the improvement comprising:
   a drag guide means comprising a ring shaped support member;
   a first beveled gun sight drag member mounted on a surface thereof and extending outwardly therefrom;
   said support surface forming rounded shoulder members adjacent said gun sight and disposed along either side thereof;
   releasable coupling means normally connecting said support and the end portion of said burner tip for mounting said gun sight on the lower surface of said burner tip extending downwardly therefrom in a vertical plane containing the longitudinal axis thereof said coupling means further comprising means cooperable between the inner surface of said support and the outer surface of said burner tip for rotatably mounting said support on said burner surrounding the tip thereof whereby said gun sight will normally ride in the channel cut by said burner and said shoulders will ride on the edges thereof.

2. The device of claim 1 further comprising at least one alternate gun sight member mounted on the outer surface of said support and extending radially outwardly therefrom so that said support may be rotated about said burner tip until said alternate gun sight is disposed to extend from the lower surface of said burner in a vertical plane containing the longitudinal axis thereof.

3. The device of claim 2 further comprising three alternate gun sight members radially mounted on said support and mutually spaced with said first gun sight equidistantly about the periphery thereof.

4. The device of claim 1 wherein said coupling means includes thread means connecting the inner surface of said support and the outer surface of said burner tip in threaded engagement.

5. In a burner tip used in a metal cutting operation for cutting a channel therein, having an elongated nozzle terminating in an end portion forming gas jets, said end portion having upper and lower longitudinal surfaces, the improvement comprising:
   a drag guide means comprising a support member; a beveled gun sight drag member mounted on a surface of said support and extending outwardly therefrom, said support surface forming rounded shoulder members adjacent said gun sight and disposed along either side thereof;

releasable coupling means normally connecting said support and the end portion of said burner tip for mounting said gun sight on the lower surface of said burner tip extending outwardly therefrom in a vertical plane containing the longitudinal axis thereof and perpendicular to the longitudinal axis, said coupling means further comprising thread means disposed on the end portion of said support opposite said gun sight, said burner tip defining an aperture in the lower surface thereof and cooperable thread means defined within the aperture, whereby said support and gun sight may be rotatably mounted on said burner tip with the end portion of said support threadedly received within the aperture, so that the gun sight will normally ride in the channel cut by said burner and said shoulders will ride on the edges thereof.

* * * * *